United States Patent [19]

Kohriyama

[11] 4,121,683
[45] Oct. 24, 1978

[54] NOISE SILENCER ASSEMBLY

[75] Inventor: Yoshimasa Kohriyama, Tsukui, Japan

[73] Assignee: Caterpillar Mitsubishi Ltd., Tokyo, Japan

[21] Appl. No.: 845,763

[22] Filed: Oct. 26, 1977

[30] Foreign Application Priority Data

Feb. 28, 1977 [JP] Japan .................. 52-023508

[51] Int. Cl.² .............................................. B60K 11/04
[52] U.S. Cl. ................................ 180/68 P; 181/211
[58] Field of Search ............... 180/54 A, 68 P, 69 R; 181/204, 210, 211; 123/198 E

[56] References Cited

U.S. PATENT DOCUMENTS

| 2,728,411 | 12/1955 | Pasturczak | 180/68 P X |
| 3,812,927 | 5/1974 | Kawamura | 180/54 A |
| 3,857,453 | 12/1974 | Buttke et al. | 181/204 X |
| 3,897,850 | 8/1975 | Thompson et al. | 180/69 R X |

FOREIGN PATENT DOCUMENTS

| 873,659 | 4/1953 | Fed. Rep. of Germany | 123/198 E |
| 51-3,733 | 1/1976 | Japan. | |
| 52-105 | 1/1977 | Japan. | |

Primary Examiner—Joseph F. Peters, Jr.
Assistant Examiner—Milton L. Smith
Attorney, Agent, or Firm—John W. Grant

[57] ABSTRACT

A noise silencer covering an air discharge opening in front of a radiator is used for noise control for an earthmoving vehicle. The silencer encloses a radiator grill which is removably attached to a forward end of an engine enclosure. The noise silencer is provided with upper and lower discharge openings with the open area of the upper opening being larger than that of the lower opening. The walls of the silencer are lined with sound absorbing materials.

6 Claims, 6 Drawing Figures

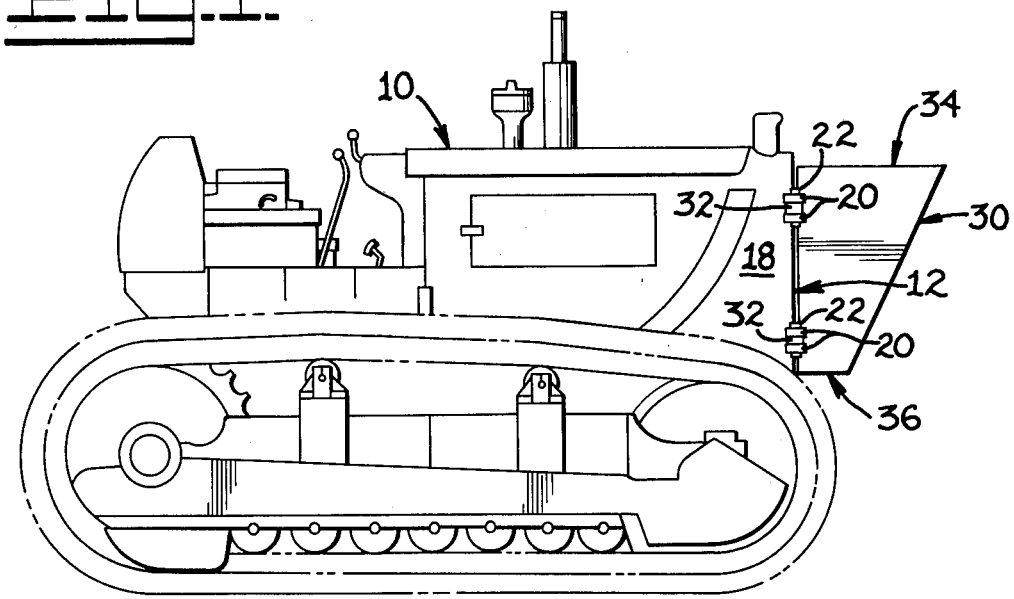
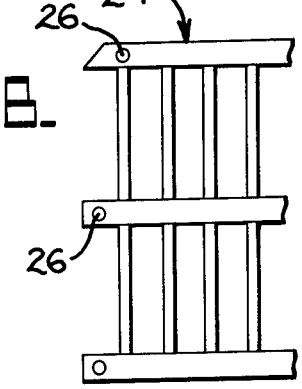
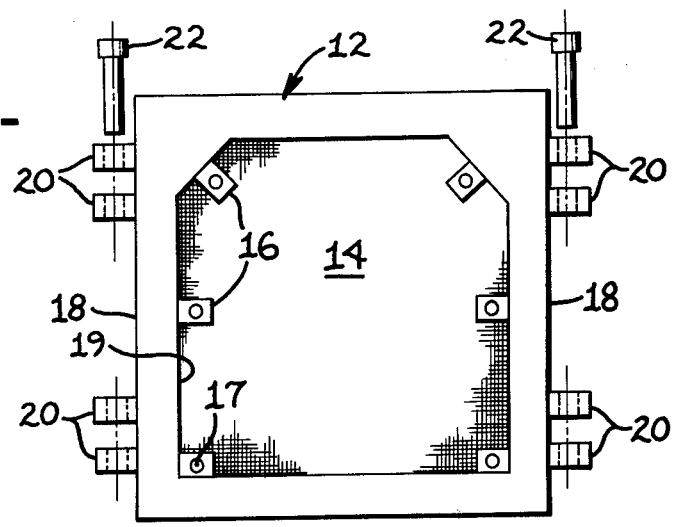
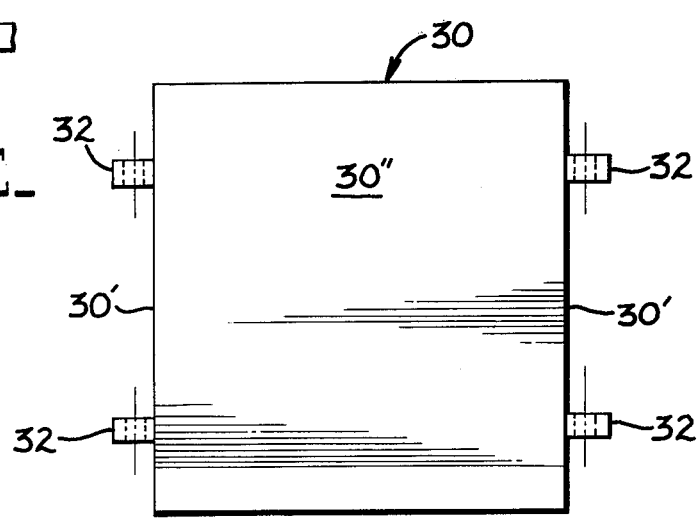

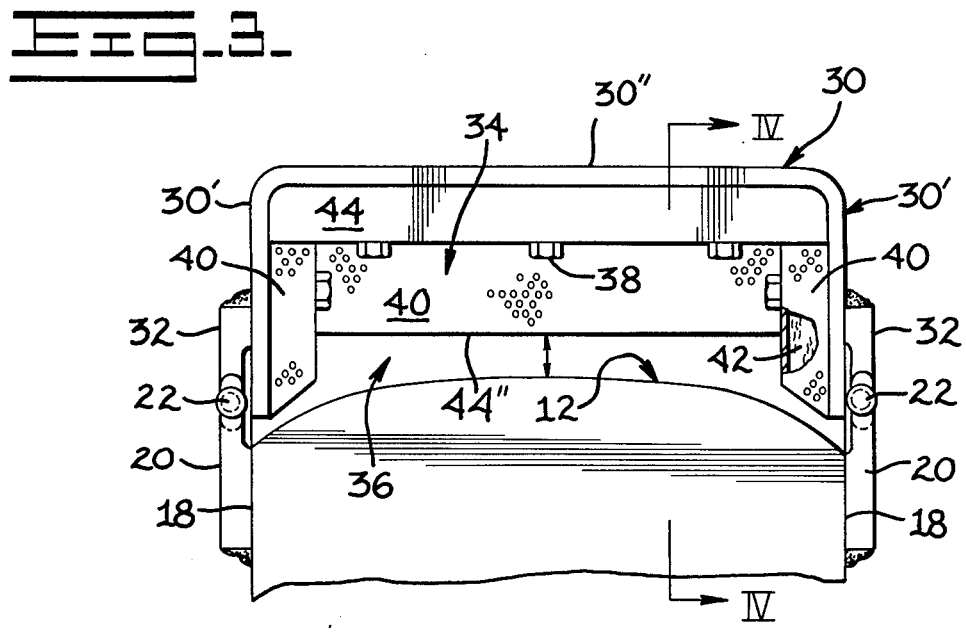
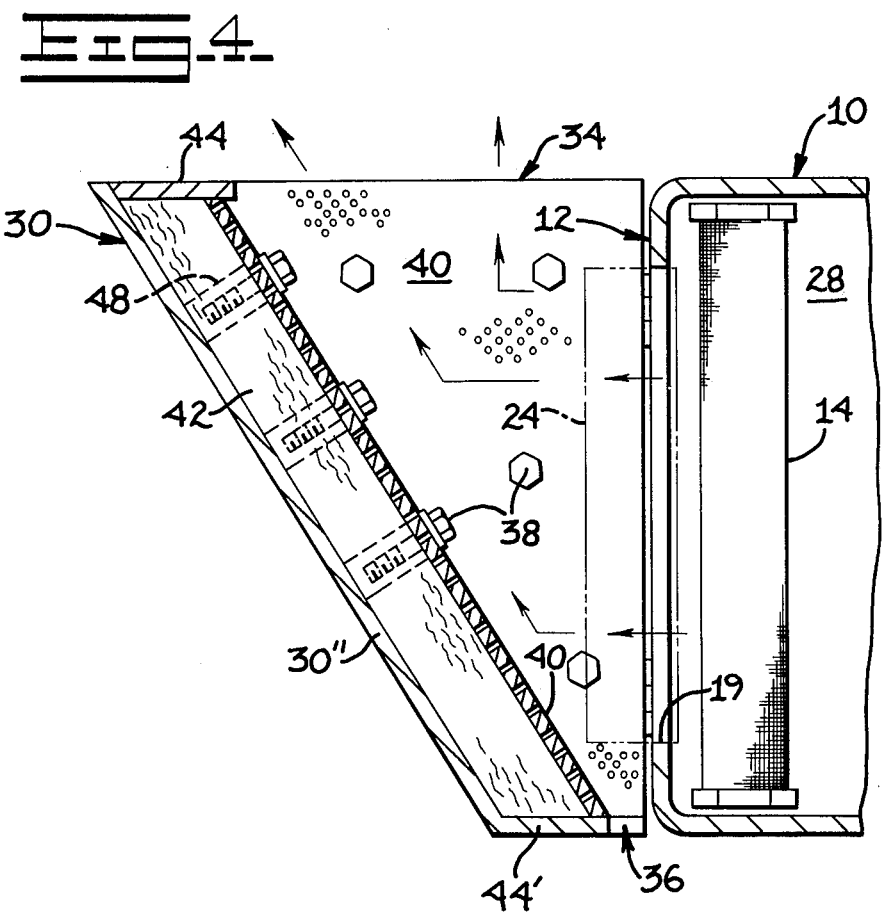

NOISE SILENCER ASSEMBLY

BACKGROUND OF THE INVENTION

This invention relates to noise control for an earthmoving vehicle and more particularly to a noise silencer provided forwardly of the radiator and removably attached to an engine enclosure.

In general, an enclosure for an engine compartment in an earthmoving vehicle consists of a hood, enclosures (side covers), dash board, radiator guard and an under guard. The enclosure protects the engine and its accessories from damage due to pebbles, branches of trees, and the like as well as shields noise emanating from the engine.

Recently the noise control for earthmoving vehicles has come to the forefront and a demand for a countermeasure to reduce the noise has arisen. As a result, strict limitations or regulations have been imposed on the earthmoving vehicles such as for instance the noise levels of vehicles which should be less than 65 db (A) as measured at a point 30 m apart from a vehicle in its nonmovable condition and less than 75 db (A) as measured at a point 30 m apart from a vehicle in its operating condition.

Prior art references having noise control apparatuses are U.S. Pat. No. 3,812,927 and Japanese Laid-open Utility Model SH051-3733. The former discloses a radiator in which a radiator mask in front of the radiator is of such shape that noise from the engine is guided upwardly through a top opening with sound absorbing material being bonded to the inner surfaces of the mask. The latter discloses a radiator in which there is provided an opening in the front portion of a radiator with the aforesaid opening being covered with ducts having a sound absorbing material bonded to the inner surfaces of the ducts. The above both attempts are successful as a noise control means to some extent. However, the radiator mask (the former attempt) and the ducts (the latter attempt) can not be removed as required and, in addition, the opening is directed only upwards with the result that foreign matter such as pebbles, sand, soil, rain, water and the like pollute or damage the sound absorbing materials provided inside and in some cases such foreign matter enters the engine compartment.

Japanese Laid-open Utility Model Publication SH052-105 improves the aforesaid shortcomings by providing upper and lower openings for a radiator mask. However, the aforesaid openings are large in diameter so that air being blown from the fan through the lower opening impinges on the ground and thus blows dust and sand upwardly causing discomfort for the operator.

SUMMARY OF THE INVENTION

According to the present invention there is provided a noise silencer assembly for use in an earthmoving vehicle. A noise silencer encloses a radiator grill which is removably attached to an engine enclosure and covers an air discharge opening which is open toward the front in front of a radiator. The noise silencer is provided with upper and lower air discharge openings with an open area of the upper opening thereof being larger than that of the lower opening. The internal space of the silencer diverges from the bottom toward the top. The walls of the silencer are lined with sound absorbing materials.

BRIEF DESCRIPTION OF THE DRAWINGS

FIG. 1 is a side elevational view of an earthmoving vehicle equipped with a noise silencer according to the present invention.

FIGS. 2A, 2B, and 2C are front views of a radiator guard, radiator grill to be attached to the radiator guard, and the noise silencer, respectively.

FIG. 3 is a partial plan view of a front portion of an engine enclosure and noise silencer attached thereto.

FIG. 4 is a cross sectional view taken along the line IV—IV of FIG. 3 with the radiator grill being shown by phantom lines.

Detailed Description

Referring to FIG. 1, an earthmoving vehicle 10 has a radiator guard 12 as part of an engine enclosure 18 positioned at the forward end of the vehicle. As shown in FIG. 4, a radiator 14 is installed within an engine compartment 28. An air discharge opening 19 is provided in the radiator guard in front of the radiator. Brackets 16, FIG. 2A, are provided at a suitable spacing about a peripheral portion of the air discharge opening 19. A radiator grill 24 is attached to the bracketsby fastening means such as bolts and nuts, not shown, for protecting the radiator. As shown in FIGS. 2A and 2B, bolt holes 17 and 26 are provided in the brackets and radiator grill, respectively, for receiving the fastening means.

A noise silencer 30 is positioned in front of the radiator grill 14 and is removably attached to the engine enclosure 18. A plurality of forwardly projecting hinge members 20 are secured to the radiator guard 12 at opposite sides thereof. The hinge members are provided in pairs with each pair receiving one of a plurality of rearwardly directed hinge plates 32 secured to the noise silencer 30. The hinge plates are removably attached to the hinge members by hinge pins 22.

The noise silencer 30 has an internal capacity sufficiently large for the radiator 14 and includes a forward outer wall plate 30" which is inclined forwardly at the top at an angle selected from a range of from about 20° to about 30° to the vertical in opposed relation to the radiator guard 12. Each of a pair of side wall plates 30' is bent at a right angle to the forward outer wall plate 30". A top plate 44 and a bottom plate 44' extend rearwardly from the top and bottom edges respectively of the forward outer wall plate. The noise silencer is provided with an upper air discharge opening 34 between the top plate and the top portion of the radiator guard and a lower air discharge opening 36 between the lower plate and the lower portion of the radiator guard.

The forward outer wall plate 30" and the side wall plates 30' of the noise silencer 30 are lined with sound absorbing materials 42. The sound absorbing materials are backed with screen members or perforated plates 40 at the internal portion of the noise silencer. Thus, the sound absorbing materials are sandwiched between the walls of the noise silencer and the perforated plates 40.

Each of the perforated plates 40 is removably attached to the respective wall by bolts 38 which are secured to pin bosses 48 secured to the walls at a suitable spacing.

The perforated plates 40 have an at least 40% opening ratio that prevents the sound absorbing material from being stained and damaged due to foreign matter entering the noise silencer. In addition, the perforated plates 40 direct part of the sound upwardly through the upper air discharge opening 34.

The sound absorbing material 42 should preferably be thick. However, materials having thicknesses selected from the range of about 25 mm to about 50 mm are sufficient for this purpose. Such sound absorbing materials can be glass wool, or the like.

The upper air discharge opening 34 of the noise silencer 30 has a large open area as compared with the lower discharge opening 36 which has a small open area. Thus, the noise silencer has an internal space which is diverging upwardly from its bottom so that air and noise passing through the air discharge opening 19 may be directed upwardly through the upper air discharge opening as indicated by the arrows in FIG. 4. The lower air discharge opening 36 is provided in the noise silencer so that pebbles, sand, soil, rain water, or foreign matter carried by the air from the engine or falling into the noise silencer from above will be discharged through the lower air discharge opening.

The lower air discharge opening 36 has a longitudinally small dimension "d", i.e., narrow width as shown in FIG. 3. This is because if the width "d" is increased excessively, then air discharged from the lower air discharge opening 36 blows sand or soil on the ground immediately under the opening 36.

In this respect, the width of the lower discharge opening 36 should desirably be in the order of 30 mm.

The lower edge 44" of the noise silencer 30 as shown in FIG. 3 extends linearly. However, since the front surface of the radiator guard 12 is curved along an arcuate form, the lower edge 44" of the bottom plate 44' could preferably be formed into an arcuate shape.

The removal of bolts 38 allows easy cleaning and replacement of the perforated plates 40 as well as cleaning and replacement of the sound absorbing materials 42. Normally, the noise silencer 30 is supported by the hinge pins 22 at both sides of the noise silencer. However, for easy repair of the silencer, maintenance and checking of the cooling fan, other engine accessories, radiator grill 24 and radiator 14, the hinge pins at one side of the noise silencer can be removed so that the silencer can be pivotally moved or turned about the hinge pins on the other side.

As is apparent from the foregoing description, the silencer 30 is provided forwardly of the radiator guard 12 and has the upper air discharge opening 34 of an open area larger than that of the lower air discharge opening 36 so that part of the sound stemming from the engine compartment 28 may be absorbed by the sound absorbing materials 42 through perforations in the perforated plates 40 while the remaining portion of the sound may be reflected by the perforated plates 40 upwardly for diffusion. In addition, the silencer 30 is formed with the lower air discharge opening having a small open area so that only a low level of sound and air is discharged therethrough.

While the present invention has been described herein with reference to a certain exemplary embodiment thereof, it should be understood that various changes, modifications and alterations may be affected without departing from the spirit of the scope of the present invention as defined in the appended claims.

What is claimed is:

1. In a noise silencer assembly for noise control for use in an earthmoving vehicle provided with a cooling fan, a radiator, an engine enclosure, and an air discharge opening in said engine enclosure and which is open forwardly thereof; the improvement comprising a radiator grill removably attached to said engine enclosure and positioned in front of said air discharge opening, and a noise silencer positioned in front of said radiator grill and removably attached to said engine enclosure, said noise silencer having an inner surface, sound absorbing material attached to said inner surface, an upper air discharge opening and a lower air discharge opening, said upper air discharge opening having an open area larger than that of said lower air discharge passage, said noise silencer having an inner space diverging from the bottom toward the top, and includes a forward plate, a pair of side plates, and a bottom plate, said forward plate being inclined at an angle selected from the range of about 20° to 30° to the vertical.

2. The radiator silencer of claim 1 wherein said lower air discharge opening has a longitudinal width of at least about 30 mm.

3. The noise silencer of claim 1 including a perforated plate for backing said noise absorbing material and being removably connected to said walls of said noise silencer sandwiching the sound absorbing material between the perforated plate and the walls.

4. The noise silencer of claim 3 wherein said perforated plate has about 40% open area.

5. The noise silencer of claim 1 wherein said sound absorbing material is made of glass wool and the like and has a thickness selected from the range of about 25 mm to about 50 mm.

6. The noise silencer of claim 1 including hinge means for removably connecting the opposite sides of the noise silencer to said engine enclosure, each of said hinge means having a hinge pin so that removing the hinge pin from the hinge means at one side allows the noise silencer to be pivoted about the hinge means on the other side.

* * * * *